(12) United States Patent
Jo et al.

(10) Patent No.: US 9,049,360 B2
(45) Date of Patent: Jun. 2, 2015

(54) MOBILE TERMINAL AND CONTROL METHOD OF MOBILE TERMINAL

(75) Inventors: Yoonjung Jo, Daegu (KR); Sangjoong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 171 days.

(21) Appl. No.: 13/396,300

(22) Filed: Feb. 14, 2012

(65) Prior Publication Data

US 2013/0038759 A1   Feb. 14, 2013

(30) Foreign Application Priority Data

Aug. 10, 2011 (KR) ........................ 10-2011-0079850

(51) Int. Cl.

| H04N 5/262 | (2006.01) |
|---|---|
| H04N 5/222 | (2006.01) |
| H04N 5/225 | (2006.01) |
| H04N 5/232 | (2006.01) |
| H04N 5/235 | (2006.01) |
| G06F 3/00 | (2006.01) |
| G06F 3/0488 | (2013.01) |

(52) U.S. Cl.
CPC ......... *H04N 5/2256* (2013.01); *H04N 5/23216* (2013.01); *H04N 5/23222* (2013.01); *H04N 5/23293* (2013.01); *H04N 5/2354* (2013.01); *G06F 3/005* (2013.01); *G06F 3/04883* (2013.01)

(58) Field of Classification Search
CPC . H04N 5/23296; H04N 5/2628; H04N 5/232; H04N 5/23212; H04N 5/23293; H04N 2101/00; H04N 1/2112; H04N 5/2251

USPC ......... 396/48, 59, 264, 286, 472; 348/207.99, 348/333.01, 240.99

See application file for complete search history.

(56) References Cited

U.S. PATENT DOCUMENTS

| 7,034,881 | B1 * | 4/2006 | Hyodo et al. ............ 348/333.12 |
|---|---|---|---|
| 8,077,249 | B2 * | 12/2011 | Huang .......................... 348/345 |
| 2007/0274703 | A1 * | 11/2007 | Matsuda ....................... 396/264 |
| 2010/0020222 | A1 * | 1/2010 | Jones et al. .............. 348/333.02 |
| 2010/0141781 | A1 * | 6/2010 | Lu .............................. 348/222.1 |
| 2010/0266206 | A1 * | 10/2010 | Jo et al. ........................ 382/190 |
| 2010/0302393 | A1 * | 12/2010 | Olsson et al. .............. 348/222.1 |
| 2011/0008036 | A1 * | 1/2011 | Takatsuka et al. ............ 396/283 |
| 2011/0243538 | A1 * | 10/2011 | Morimoto ....................... 396/77 |
| 2011/0304749 | A1 * | 12/2011 | Ishikawa .................... 348/240.1 |
| 2012/0120277 | A1 * | 5/2012 | Tsai ............................ 348/223.1 |
| 2013/0201344 | A1 * | 8/2013 | Sweet et al. ................. 348/169 |

* cited by examiner

*Primary Examiner* — Tuan Ho
*Assistant Examiner* — Selam Gebriel
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a camera configured to output a camera preview image; a display unit configured to display the camera preview image output by the camera; and a controller configured to set a reference region on the display unit, and to output position information regarding positions of an object included in the camera preview image and the set reference region.

13 Claims, 16 Drawing Sheets

MOBILE TERMINAL AND CONTROL METHOD OF MOBILE TERMINAL

CROSS-REFERENCE TO RELATED APPLICATIONS

Pursuant to 35 U.S.C §119, this application claims the benefit of earlier filing date and right of priority to Korean Application No. 10-2011-0079850, filed in Republic of Korea on Aug. 10, 2011, the contents of which is incorporated by reference herein in its entirety.

BACKGROUND OF THE INVENTION

1. Field of the Invention

The present invention relates to a mobile terminal (portable terminal) capable of capturing an image, and a control method of mobile terminal.

2. Background of the Invention

Mobile device (mobile terminal, portable device, portable terminal) can be easily carried and have one or more of functions such as supporting voice and video telephony calls, inputting and/or outputting information, storing data and the like.

As it becomes multifunctional, the mobile terminal can be allowed to capture still images or moving images, play music or video files, play games, receive broadcast and the like, so as to be implemented as an integrated multimedia player.

Various new attempts have been made for the multimedia devices by hardware or software in order to implement such complicated functions.

Furthermore, many efforts are undergoing to support or enhance various functions of such mobile terminals. Such many efforts include not only changes and improvement of structural components implementing a mobile terminal but also software or hardware improvement.

Also, when a user captures (photographs) himself/herself using a camera provided in the mobile terminal, there is a problem that the user who is the subject performing the capturing and an object to be captured, is partially included in a captured image.

SUMMARY OF THE INVENTION

Therefore, an aspect of the detailed description is to provide a mobile terminal capable of capturing an object which is settled within a desired region by a user, and a control method thereof.

To achieve these and other advantages and in accordance with the an embodiment of the present invention, as embodied and broadly described herein, there is provided a mobile terminal including a display unit to output an image input via a camera, and a controller to set a reference region on the display unit, and output position information regarding an object included in the image based on the set reference region.

In one embodiment, the controller may display a guide image corresponding to the reference region on the display unit.

In another embodiment, at least one of shape, position and size of the guide image displayed on the display unit may be based on a user selection.

In another embodiment, the at least one of shape, position and size of the guide image may change based on a user selection.

In another embodiment, a plurality of guide images may be displayed on the display unit, and the controller may set a region corresponding to one image selected by a user from the guide images as the reference region.

In another embodiment, the display unit may be formed to be touch-sensitive, and the reference region may be set to correspond to a trace of a touch input detected on the display unit.

In another embodiment, the controller may determine whether or not the object is located on the reference region, and output relative position information relating to the reference region and the object based on the determination.

In another embodiment, the controller may output the position information using at least one of voice and a flash.

In another embodiment, the controller may change brightness of the flash according to the degree that the object corresponds to the reference region.

In another embodiment, when the camera enters a capturing mode, the object may be output on the display unit, and when the object is located on the reference region, the image output on the display unit may be stored.

In another embodiment, the controller may automatically adjust a magnification of the camera such that the object can have a size within a preset range when the object is located to correspond to the reference region.

In another embodiment, the controller may recognize a plurality of objects from the image, and determine whether the recognized plurality of objects are all located on the reference region.

In another embodiment, when at least one of the plurality of objects exceeds a preset size based on the reference region, the controller may output separation information indicating that the object is out of the reference region.

In another embodiment, the number of objects recognized by the controller may be set by a user selection.

In another embodiment, when the object is located on the reference region, the controller may capture an image input via the camera.

In another embodiment, an image input via the camera may be captured when the magnification of the camera is adjusted such that the object corresponds to the reference region.

To achieve these and other advantages and in accordance with an embodiment of the present invention, as embodied and broadly described herein, there is provided a method for controlling a mobile terminal including outputting an image input via a camera, recognizing an object included in the image, and outputting relative position information relating to the recognized object and a preset reference region.

In one embodiment, at the outputting of the position information, whether the recognized object is located on the reference region may be determined.

In another embodiment, at the outputting of the position information, a relative distance between the reference region and the recognized object may be calculated, and when the calculated distance is more than a preset range, voice information or text information may be output to guide the recognized object to be located within the reference region.

In another embodiment, when the calculated distance is within the preset range, position information may be output to indicate that the recognized object is located on the reference region, and an image input via the camera is captured automatically or by a user selection.

In another embodiment, when the camera is provided in plurality and a user selects one of the recognized objects, one of the cameras may be allowed to adjust a magnification of the selected object of the image, and the other camera of the cameras may be allowed to adjust a magnification of the other portion of the image excluding the selected object, and the selected object of the image input via the one camera and the other portion of the image input via the other camera and excluding the selected object may be combined into an image to be output on the display unit where the image is output.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings.

DETAILED DESCRIPTION OF THE INVENTION

Description will now be given in detail of the embodiments, with reference to the accompanying drawings. For the sake of brief description with reference to the drawings, the same or equivalent components will be provided with the same reference numbers, and description thereof will not be repeated. Hereinafter, suffixes "module" and "unit or portion" for components used herein in description are merely provided only for facilitation of preparing this specification, and thus they are not granted a specific meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Mobile terminals described in this specification may include cellular phones, smart phones, laptop computers, digital broadcasting terminals, personal digital assistants (PDAs), portable multimedia players (PMPs), navigators, and the like. However, it may be easily understood by those skilled in the art that the configuration according to the embodiments of this specification can be applied to stationary terminals such as digital TV, desktop computers and the like excluding a case of being applicable only to the mobile terminals.

Figure 1:
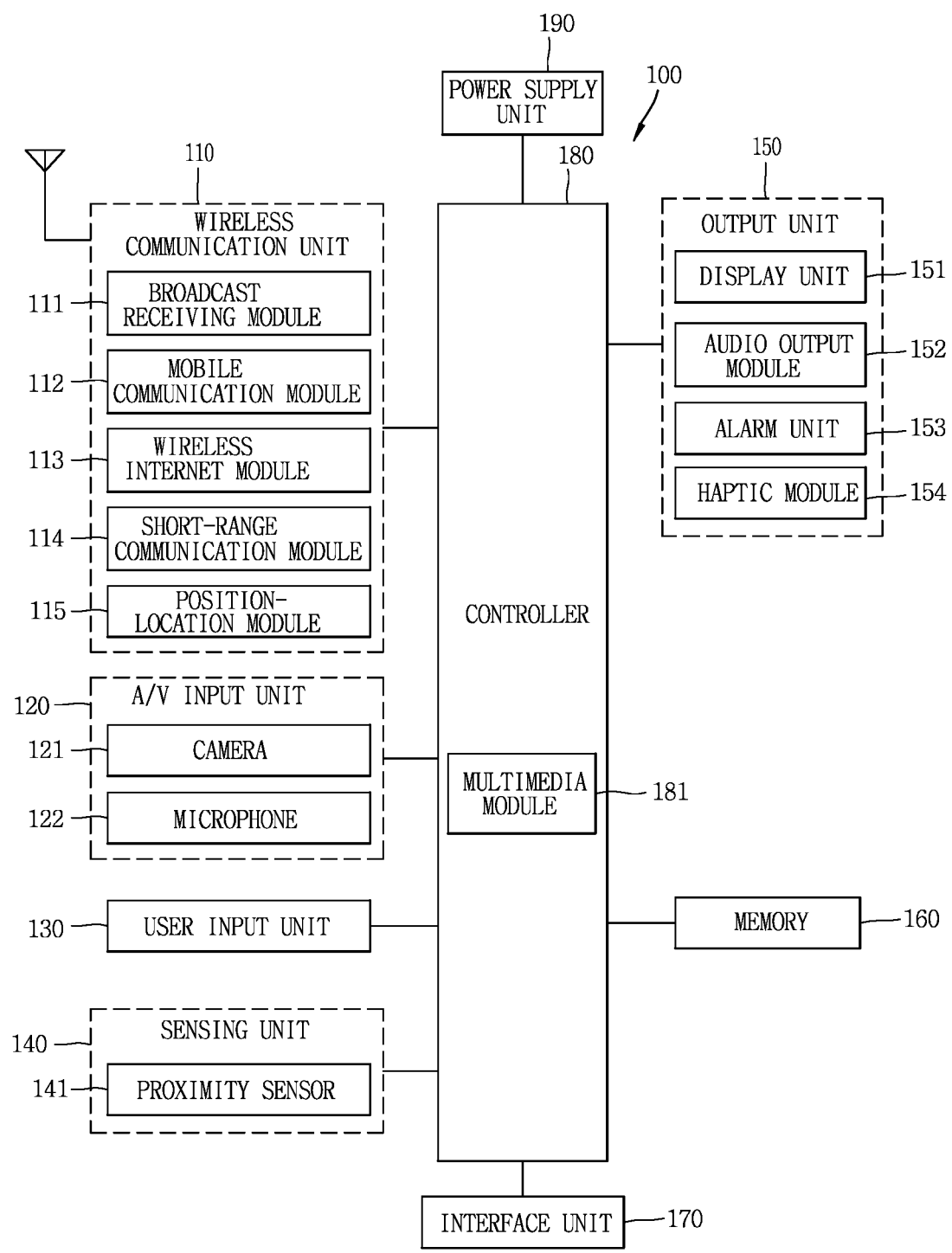
FIG. 1 is a block diagram of a mobile terminal in accordance with one embodiment.

FIG. 1 is a block diagram of a mobile terminal 100 in accordance with one embodiment.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, and the like.

The location information module 115 denotes a module for detecting or calculating a position of a mobile terminal. An example of the location information module 115 may include a Global Position System (GPS) module.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 152, an alarm unit 153 and a haptic module 154.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, the sensing unit 140 may include a proximity sensor arranged at an inner region of the mobile terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. Since the video or audio signals can be output through the display unit 151 or the audio output module 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

Also, the controller 180 may execute a lock state, in which a user is restricted from inputting a control command for applications, when a state of the mobile terminal satisfies a preset condition. The controller 180 may control a lock screen, which is displayed in the lock state, based upon a touch input detected on the display unit 151 (hereinafter, referred to 'touch screen') in the lock state.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, or a selective combination thereof. In some cases, such embodiments are implemented by the controller 180.

For a software implementation, the embodiments such as procedures and functions may be implemented together with separate software modules each of which performs at least one of functions and operations.

The software codes can be implemented with a software application written in any suitable programming language. Also, the software codes may be stored in the memory 160 and executed by the controller 180.

Hereinafter, description will be given of components provided in the mobile terminal in accordance with the embodiment shown in FIG. 1.

Figure 2A:
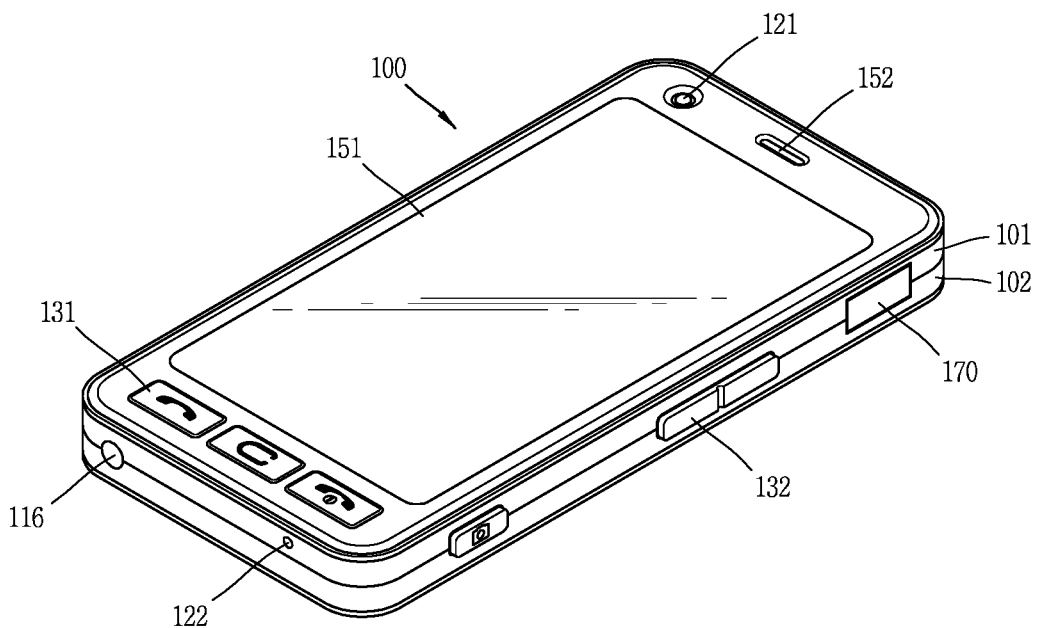
FIG. 2A is a front perspective view showing an example of the mobile terminal.
Figure 2B:
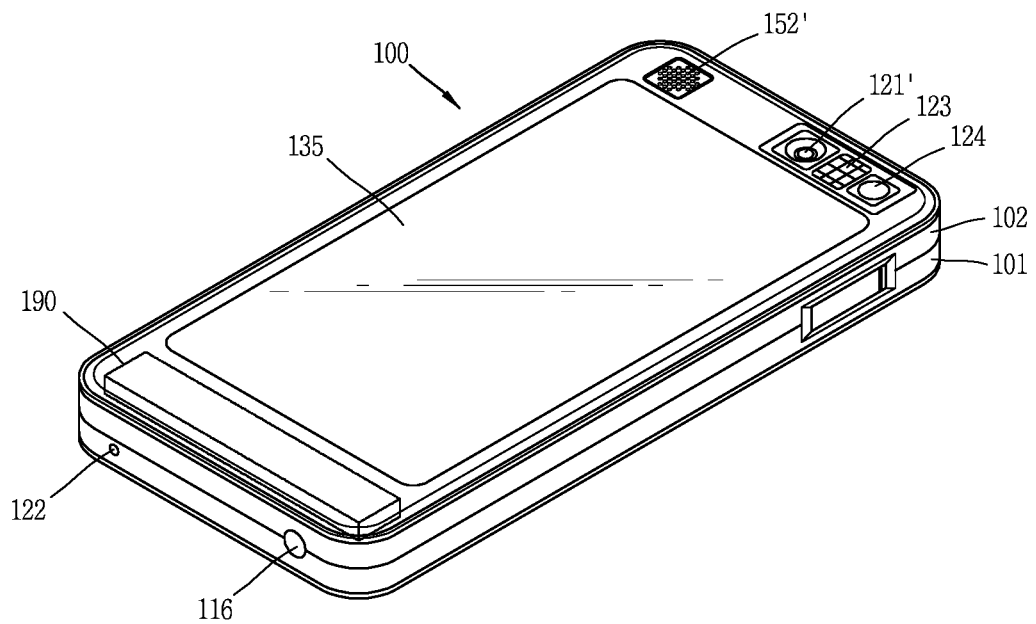
FIGS. 2B and 2C are rear perspective views of the mobile terminal of FIG. 2A.

FIG. 2A is a front perspective view showing an example of the mobile terminal, and FIG. 2B is a rear perspective of the mobile terminal of FIG. 2A.

The mobile terminal 100 disclosed herein is provided with a bar-type terminal body. However, the present application is not limited to this type of terminal, but is also applicable to various structures of terminals such as slide type, folder type, swivel type, swing type, and the like, in which two or more bodies are combined with each other in a relatively movable manner.

As shown in FIGS. 2A and 2B, a terminal main body (hereinafter, referred to as 'body') 100 may include a front surface, side surfaces and a rear surface. Also, the body may have both ends formed in a lengthwise direction.

A body may include a case (or referred to as casing, housing, cover, etc.) defining an appearance of the mobile terminal 100. In this embodiment, the case may be divided into a front case 101 and a rear case 102. A space formed between the front and rear cases 101 and 102 may accommodate various electronic components. At least one intermediate case may further be disposed between the front and the rear cases 101 and 102.

Such cases may be injected using a synthetic resin or be formed of a metal, such as stainless steel (STS), titanium (Ti) or the like.

The terminal body is shown having a display unit 151, an audio output module 152, a camera 121, a user input unit 130/131, 132, a microphone 122, an interface unit 170, and the like. An antenna 116 may also be provided.

The display unit 151 may occupy most of a principal surface of the front case 101. The audio output module 152 and the camera 121 may be disposed near one of both end portions of the display unit 151, and the user input unit 131 and the microphone 122 on the other end portion of the display unit 151. The user input unit 131, the interface unit 170 and the like may be disposed on side surfaces of the front and rear cases 101 and 102. The microphone 122 may be disposed on the other end of the body 100.

The user input unit 130 may be manipulated to allow inputting of commands for controlling operations of the mobile terminal 100, and include a plurality of first manipulation units 131, 132. The plurality of manipulation units 131, 132 may be referred to as a manipulating portion. Such manipulating portion can employ any tactile manner that a user can touch or tap for manipulation.

The first and second manipulation units 131, 132 may be set to allow inputting of various contents. For example, the first manipulation unit 131 may be configured to input commands such as START, END, SCROLL or the like, and the second manipulation unit 132 may be configured to input commands, such as a volume adjustment of sounds output from the audio output module 152, conversion of the display module 210 into a touch recognition mode, or the like.

The content inputted by the manipulation units 131, 132 may be set in various ways. For example, the first manipulation unit 131 may be used to receive a command, such as start, end, scroll, or the like, and the second manipulation unit 132 may be used to receive a command, such as controlling a volume level being outputted from the audio output unit 152, or switching it into a touch recognition mode of the display module 151.

The rear case of the terminal body may further be provided with a camera 121'. The camera 121' faces a direction which is opposite to a direction faced by the camera 121 (see FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed in the terminal body to be rotatable or popped up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

Referring to FIG. 2B, an audio output module 152' may further be disposed at a rear face of the terminal body, namely, the rear case 102. The audio output module 152' can cooperate with the audio output module 152 (see FIG. 2A) to provide stereo output. Also, the audio output module 152' may be configured to operate as a speakerphone.

A power supply unit 190 for supplying power to the mobile terminal 100 may be mounted in the terminal body. The power supply unit 190 may be mounted in the terminal body or detachably coupled directly onto the outside of the terminal body.

The rear case 102 may be further provided with a touchpad 135 for detecting a touch input. Similar to the display module 210, the touchpad 135 may be implemented as a light-transmissive type. Here, if the display unit 151 is configured to output visual information from both surfaces, the visual information can be recognized through the touchpad 135. The information output from the both surfaces may all be controlled by the touchpad 135. Unlike to this, a display may further be mounted on the touchpad 135 so as to configure a touch screen even on the rear case 102.

The touchpad 135 may operate mutually in association with the display unit 151 of the front case 101. The touchpad 135 may be provided on the rear of the display unit 151 in parallel to each other. The touchpad 135 may have a size the same as or smaller than the size of the display unit 151.

In the mobile terminal having those components, an image input via the camera 121, 121' may be output on the display unit 151 when the camera 121, 121' is in a capturing mode, and the controller 180 may recognize a captured object included in the image which is output on the display unit 151.

The controller 180 (see FIG. 1) may set a reference region on the display unit 151 based on a user selection. The reference region acts as a reference of a position where the object is displayed on the display unit 151.

After recognition of the object, the controller 180 may output position information related to an object which is recognized based on the set reference region.

Here, the position information indicates a relative distance between the object and the reference region, a direction, a focus and the like. The controller 180 may output the position information using a sound, a text, the flash 123 and the like, to control the object to be located within the reference region.

Hereinafter, description will be given of a control method for recognizing an object and outputting relative position information between the recognized object and a reference region, with reference to FIGS. 3 and 4.

Figure 3:
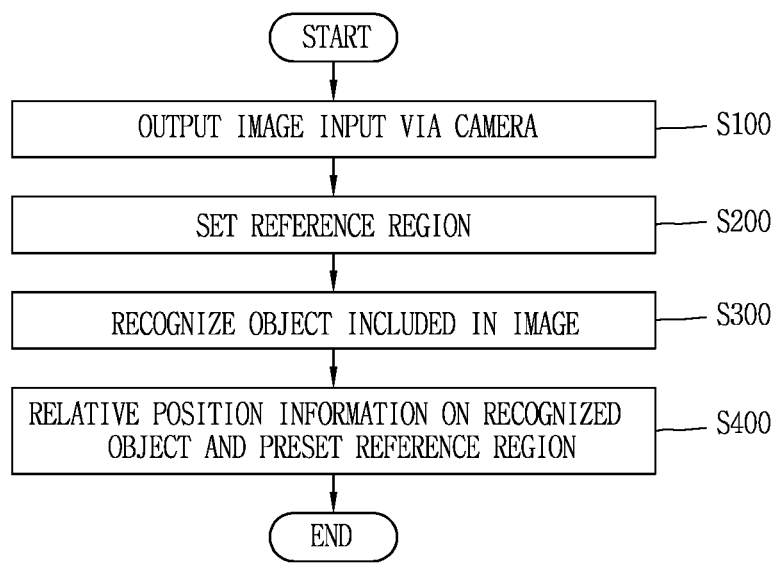
FIG. 3 is a flowchart showing a control method for a mobile terminal in accordance with one embodiment.
Figure 4:
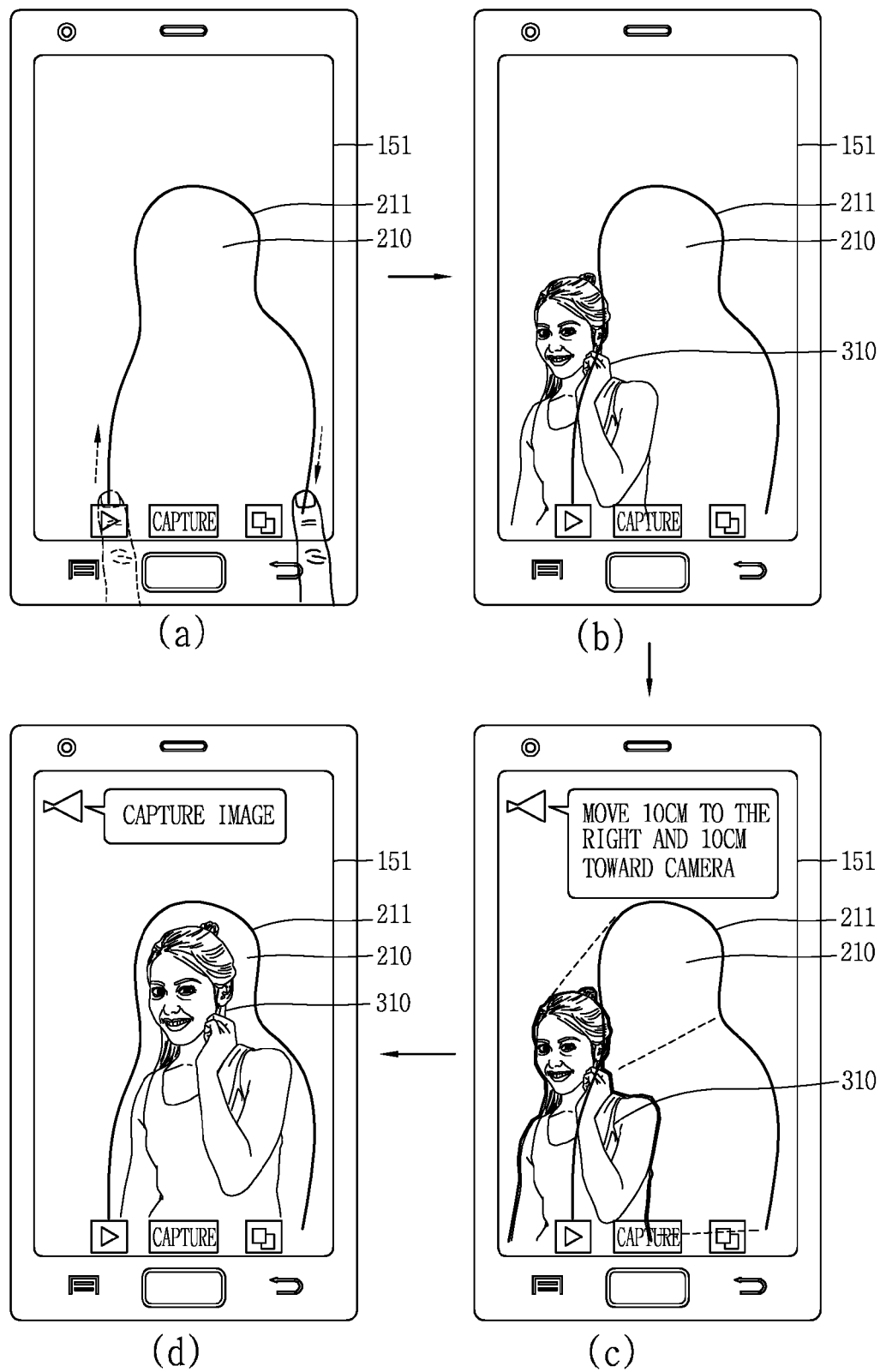
FIG. 4 is an overview showing the control method for the mobile terminal.

FIG. 3 is a flowchart showing a control method for a mobile terminal in accordance with one embodiment, and FIG. 4 is an overview showing the control method for the mobile terminal.

According to the control method, when the mobile terminal enters a capturing mode in which the camera 121 or 121' is activated, the display unit 151 outputs an image input via the camera 121 or 121' (S100).

As aforementioned, the mobile terminal is provided with a plurality of cameras 121 and 121'. One of the plurality of cameras may be activated or all of the plurality of cameras may be simultaneously activated in the capturing mode depending on a user selection or a setting of the controller 180. Also, of the plurality of cameras 121 or 121', a camera in an inactive state may be converted into the active state and a camera in an active state may be converted into the inactive state, or vice versa.

Hereinafter, description will be given of a method for capturing an image by activating one camera 121 or 121'. However, in a mobile terminal capable of capturing a three-dimensional (3D) image, a plurality of cameras, typically two cameras are provided. So, in this case, the plurality of cameras may be activated at the same time.

Once the camera 121 or 121' is activated (S100), the controller 180 sets a reference region on the display unit 151. The reference region as a region included in the display unit 151 may act as a reference to guide a region where an object included in an image input via the camera 121 or 121' is to be displayed.

Here, the object indicates an object as a target whose image is to be captured, for example, a target such as people or things, captured in a photo. Meanwhile, at least one of a shape of the reference region, and a position and size thereof on the display unit 151 may be set based on a user selection.

Also, when the position, the size, the shape or the like of the reference region is not especially selected by the user, the controller 180 may set the reference region according to preset shape, size and position. Regarding the method for setting the reference region, FIG. 4 shows a method for setting a reference region according to a user selection.

Upon setting the reference region according to a user selection, as shown in FIG. 4(a), when a user's touch input is detected on the display unit 151, the controller sets a reference region 210 to correspond to (match with) a trace of the detected touch input. In addition to the way that the controller 180 sets the reference region 210 based on the user's touch input, one of a plurality of reference regions 210 having different shapes, stored in the memory 160, may be selected by the user, and the selected one may be set to the reference region 210.

Upon the reference region 210 being set, the controller 180 displays a guide image 211 to correspond to (match, be located on) the set reference region 210, thereby providing the user with visual information regarding the reference region 210. The guide image 211 is displayed on the display unit 151 to make the user identify the reference region 210. The guide image 211 may be displayed along an outline of the reference region 210 or displayed to substantially correspond to the reference region 210.

The guide image 211 may also be transparently displayed such that an image input via the camera 121 or 121' can be output on the display unit 151. That is, the guide image 211 may overlap an image input via the camera 121 or 121'. As aforementioned, when the image input via the camera 121 or 121' is output on the display unit 151 (S100) and the reference region is set (S200), the controller 180 recognizes an object included in the image (S300).

Here, the controller 180 can recognize the object included in the image even before the reference region is set. The object, as mentioned above, indicates an object as a target whose image is to be captured, for example, a target such as people or things, captured in a photo. The controller 180 may recognize the object included in the image by using an object or figure recognition algorithm.

The object or figure recognition algorithm is used to recognize an object or a person included in an image input via the camera 121 or 121', and may allow for recognition and detection of a person or object using outline information or appearance relating to a person or object, which is distinguished from other regions in the image. The object or figure recognition algorithm may include an object region extraction process of identifying where is a face or object on an entire image, and a face or object recognition process of determining who or what is the identified face or object.

The face recognition process may be carried out to determine a face based on main portions of a face, namely, distances and shapes of eyes, a nose and a mouth. After recognizing the object included in the image (S300), the controller 180 outputs relative position information regarding the recognized object and the reference region (S400).

To output the relative position information, the controller 180 may first determine whether the recognized object is located on (within) the reference region. In other words, this is to determine whether an object is recognized on the set reference region. 'Object is located on or corresponds to the reference region' indicates that the recognized object occupies the greater part of the reference region, namely, the reference region by more than a preset range.

For example, referring to FIG. 4(b), since a region where a recognized object 310 is displayed partially overlaps the reference region 210, this may be represented as 'the recognized object 310 occupies a part of the reference region, namely, occupies the reference region below a preset range.' When the greater part of the region where the recognized object 310 is displayed overlaps the reference region 210, this may be represented as 'the recognized object 310 is located on (corresponds to) the reference region.'

Meanwhile, the controller 180 may determine whether the recognized object 310 is located on the reference region 210, by calculating a relative distance between the reference region 210 and the recognized object 310, and determining whether the calculated distance is within a preset range or not. Here, the preset range may be automatically set by the controller 180 or by a user selection.

For example, when the calculated distance exceeds the preset range, the controller 180 may determine that the recognized object is not located on the reference region. When the calculated distance is within the preset range, the controller 180 may determine that the recognized object is located on the reference region.

Also, when the distance between the object 310 and the reference range 210 exceeds the preset range, the controller 180 may calculate a direction in which the object 310 should move to be located on the reference region 210. Also, even when the calculated distance is within the preset range, the controller 180 may determine a range that the recognized object occupies the reference region. When the recognized object does not occupy the reference region by more than a preset range, the controller 180 may determine that the recognized object is not located on the reference region. Here, a specific range occupied by the object may be automatically set by the controller 180 or selected by a user.

As mentioned above, the controller 180 may estimate or calculate a relative distance or direction between the object 310 and the reference region 210, a range that the object 310 occupies the reference region 210, and the like, thereby outputting corresponding position information. For example, as shown in FIG. 4(c), when the object 310 is not located on the reference region 210, the controller 180 may calculate a distance between the reference region 210 and the object 310, a direction that the object 310 should move to be located on the reference region 210, and a direction that the object 310 should move to occupy the reference region 210 by more than a specific range.

Also, the controller 180 may output the calculated information, namely, information represented as 'position information' in the above description. The position information may be output in form of voice, electronic sound and the like via the audio output module 152, output on the display unit 151 in form of text or icon, or output according to changes in brightness of light using the flash 123 (see FIG. 2B).

Meanwhile, as the position information is output in form of voice or electronic sound or via the flash, the position information can be efficiently provided even when the user is unable to directly view the display unit 151. As another example, as shown in FIG. 4(d), when the object 310 is located on the reference region 210 with occupying it by more than a specific range, the controller 180 may output position information indicating that the object 310 is located on the reference region 210.

Also, the controller 180 may automatically store an image output on the display unit 151 in the memory 160 when the object 310 is located on the reference region with occupying the reference region 210 by more than the specific range. The controller 180 may also store the image output on the display unit 151 in the memory 160 by recognizing a control command using a user's voice. For example, when recognizing a voice command 'capture,' the controller 180 may store the image output on the display unit 151. In this case, the voice command recognized by the controller 180 may correspond to a control command stored in the memory 160.

As described above, according to the mobile terminal and the control method thereof in accordance with the embodiment, an object may be recognized and a position of the object may be compared with a set region, thereby determining whether the object is located on the set region.

Also, according to the mobile terminal and the control method thereof in accordance with the embodiment, an object included in an image may be recognized and the recognized object is compared with a reference region so as to output position information regarding the object to a user, thereby making the object captured at a position that the user desires.

Hereinafter, description will be given of methods for setting the reference region, with reference to FIGS. 5A to 5C, which are overviews showing a method for setting a reference region in a mobile terminal in accordance with one embodiment. First, as aforementioned, the reference region is a region included in the display unit 151, and acts as a reference to guide a region where an object included in an image input via the camera 121 or 121' is to be displayed. The reference region may have a shape according to a user selection or a default shape set by the controller 180. Size, position and the like of the reference region may depend on a user selection.

First, a method for setting a reference region corresponding to the default shape will be described. Referring to FIG. 5A, the controller 180 may set the reference region 210 on the display unit 151 when a user selection to set 'reference region' is detected or the camera 121 or 121' enters a capturing mode. The reference region 210 may be displayed when a touch input is detected on the display unit 151.

That is, the controller 180 may display a guide image 211 corresponding to the reference region 210 on the display unit 151, in order to provide a user with information related to the set reference region 210. The user selection to set the reference region 210 may be achieved by an input corresponding to a preset method, such as entering a capturing menu or the like or applying a touch input onto the display unit 151 or the like.

The position, size and the like of the reference region 210 may change based on a user selection, in response to a touch input on the touch-sensitive display unit 151, or using a user input unit 130 (see FIG. 1). For example, as shown in FIG. 5A, a size of a reference region 210a having a preset shape may change by dragging a guide image 211a displayed on the display unit 151.

When a user drags the guide image 211a displayed on the display unit 151 sequentially toward a first point, a second point and a third point (i.e., 220a-220b-220c), the guide image 211a, as shown in the drawing, may extend (i.e., 211a-211b-211c) to correspond to the first to third points, and in turn the reference region 210 may extend sequentially toward 210a-210b-210c.

The size of the reference region 210 may extend or be reduced until a touch input on the display unit 151 is not detected any more. Alternatively, the size of the reference region 210 may change in response to a preset touching, such as single touch, double touch, sliding, flicking and the like, in addition to the dragging. The controller 180 may change a region where the reference region is located on the display unit 151 based on a user selection.

Figure 5A:
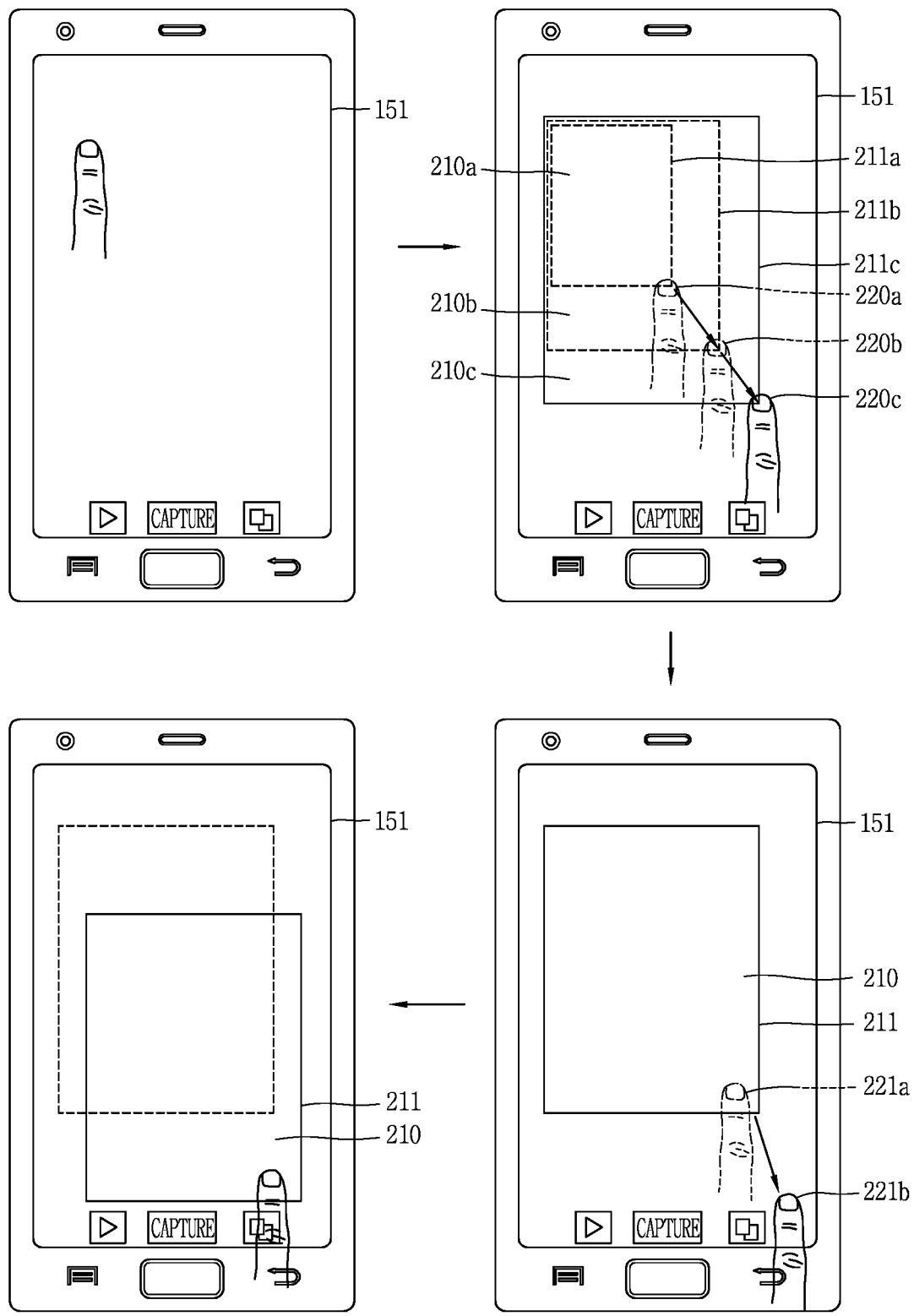
FIGS. 5A to 5C are overviews showing a method for setting a reference region in a mobile terminal in accordance with one embodiment.
Figure 5B:
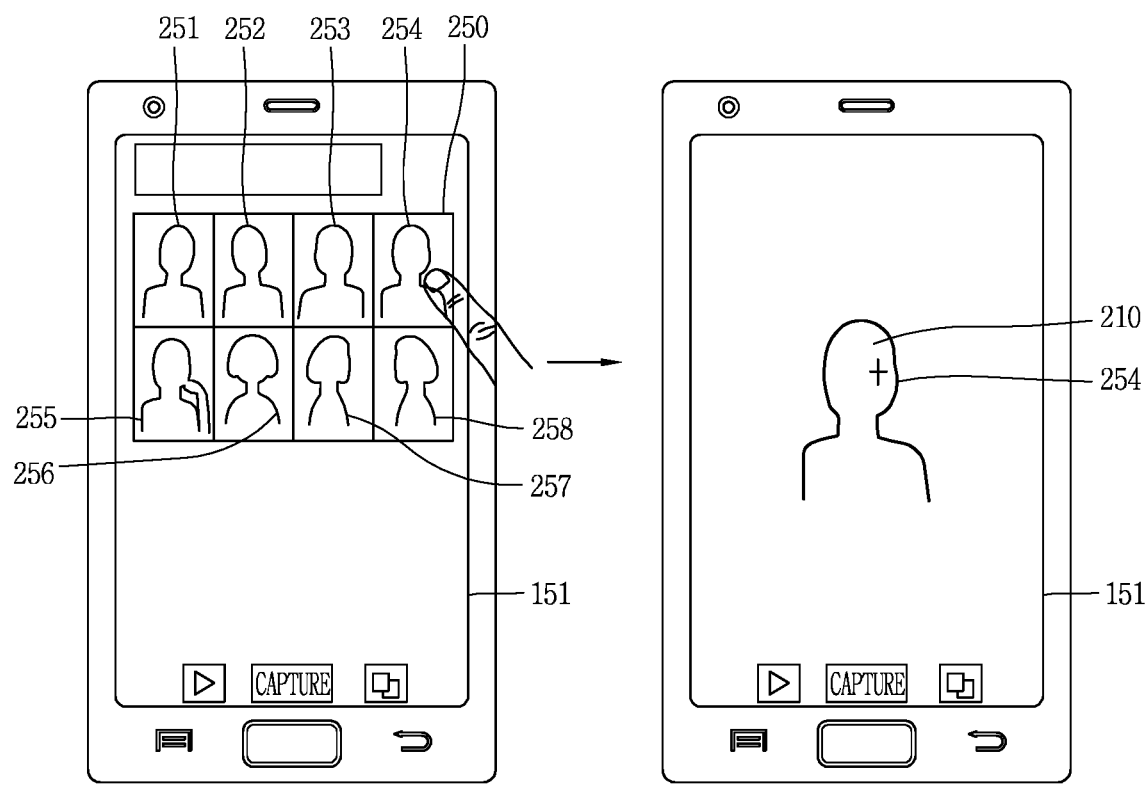
Figure 5C:
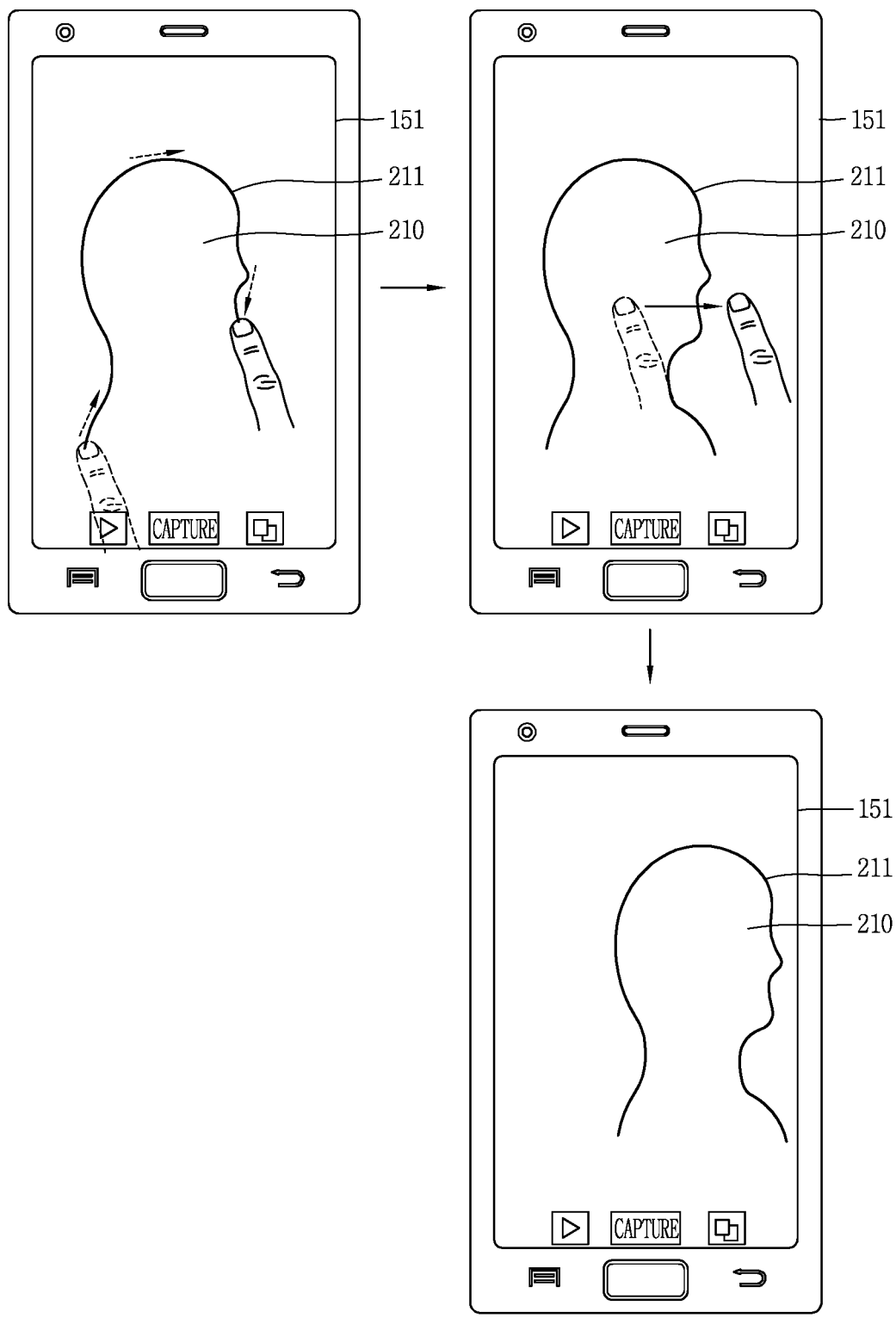

For example, as shown in FIG. 5A, when a part of the guide image 211 on which the reference region 210 is displayed is touched by a user to be moved from the first point 221a to the second point 211b, the position of the reference region 210 may change in association with the second point 221b. As mentioned above, the size and shape of the reference region 210 may change in response to the user's input.

Also, the shape of the reference region 210 may be stored in the memory 160 and the like, and set in various shapes in addition to the default shape stored in the memory 160. Such setting of the shape may be achieved by a user selection or a user's direct input. As one example, as shown in FIG. 5B, the controller 180 may display various shapes 251 to 258 stored in the memory 160 on a select window 250, and one of the shapes selected by a user may be set to the reference region

210. Accordingly, a guide image 254 corresponding to the selected shape may be displayed on the display unit 151.

Here, the controller 180 may determine whether a recognized object corresponds to the selected shape. As another example, as shown in FIG. 5C, a region corresponding to a user's direct input may be set to a reference region. Here, the controller 180 may set the reference region 210 to correspond to a trace of a touch input detected on the display unit 151, or to correspond to a trace input via the user input unit 130 (see FIG. 1).

Even in this instance, the controller 180 may determine whether the recognized object corresponds to the shape of the reference region input by the user. The reference region selected or input by the user may re-change in size, shape, position and the like, anytime based on the user selection. As mentioned above, in the mobile terminal and the control method thereof according to the embodiment, a reference region can be set by a user selection or the controller 180 in various manners, and the size, shape, position and the like of the reference region may change as the user desires.

As such, when the reference region is set and the object is recognized by the controller 180, the controller 180 may determine whether the recognized object is located on the reference region with occupying the reference region by more than a specific range, and output position information corresponding to the determination in various manners.

The controller 180, as aforementioned in FIGS. 4C and 4D, may output the position information using at least one of sound and text, using the flash 123 (see FIG. 2B) or using a projector function provided in the mobile terminal.

Figure 6A:
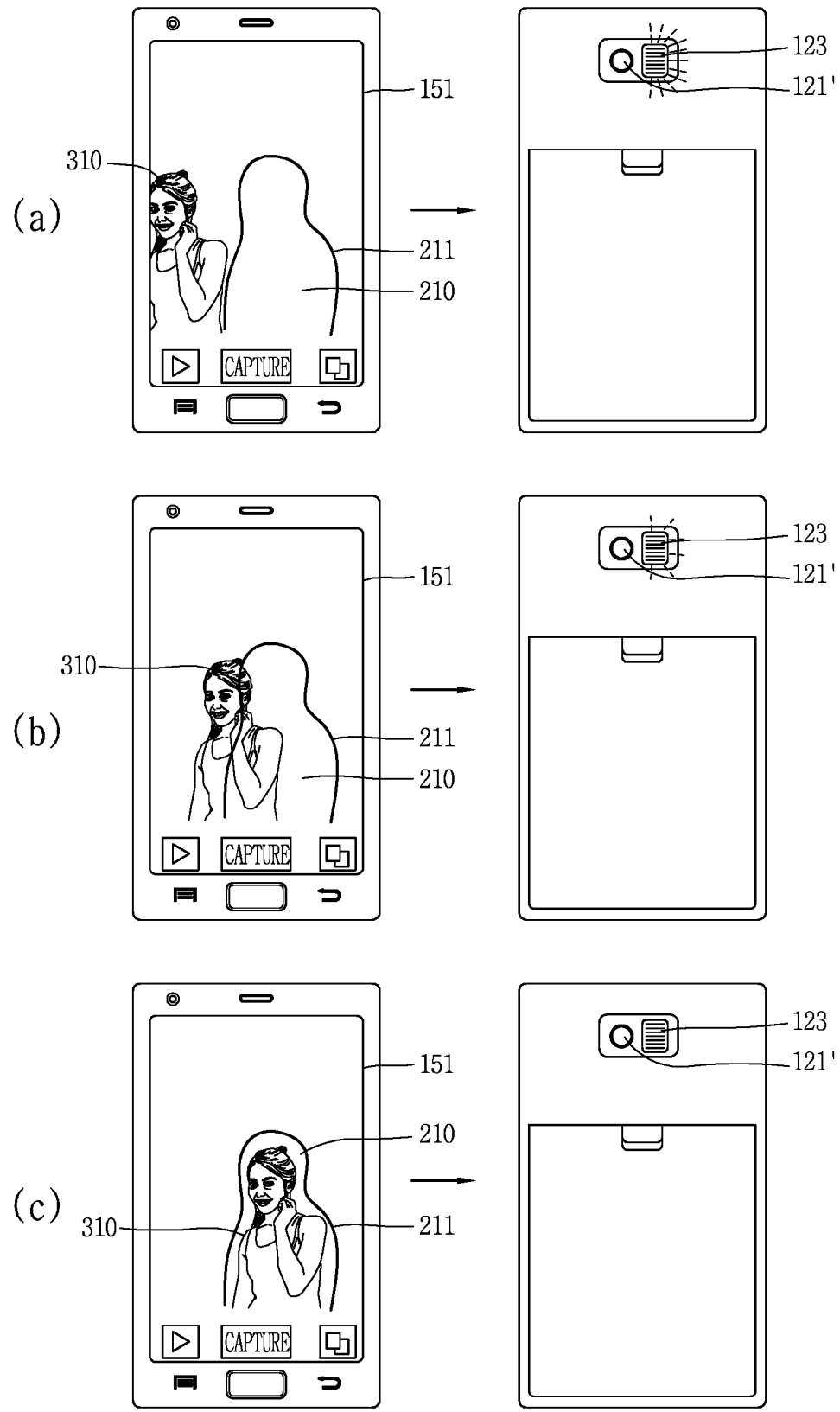
FIGS. 6A to 6D are overviews showing a method for outputting position information in a mobile terminal in accordance with one embodiment.

Hereinafter, a method for outputting position information using the flash 123 will be described in more detail with reference to FIG. 6A. As shown in FIG. 6A(*a*), when a relative distance between the recognized object 310 and the reference region 210 is more than a set range, the controller 180 may activate the flash 123. Here, the brightness of the flash 123 may depend on the relative distance between the object 310 and the reference region 210.

For example, a distance between the object 310 and the reference region 210 in FIG. 6A(*b*) is shorter than a distance between the object 310 and the reference region 210 in FIG. 6A(*a*). In this instance, the controller 180 may adjust the brightness of the flash 123 in FIG. 6A(*b*) to be darker than that in FIG. 6A(*a*), thereby informing the user that the object is closer onto the reference region than the previous case.

Referring to FIG. 6A(*c*), when the object 310 is located on the reference region 210, the controller 180 deactivates the flash 123 to inform the user that the object is located on a position that the user wants. In an alternative embodiment, when the object 310 is located on the reference region 210, the controller 180 may activate the flash 123. As the distance between the reference region 210 and the object 310 becomes farther, the controller may deactivate the flash 123, thereby providing position information to the user.

Thus, by providing the position information using the flash 123, the user who is unable to view the display unit 151 while capturing an image can know the relative location of the reference region 210 and the object 310. Sound may also be used to notify the user. Especially, upon using the flash 123 or sound, the position information can be provided to the user more efficiently when the user performs a self-capturing process with a mobile terminal which does not have the camera 121 on its front surface where the display unit 151 is provided.

Figure 6B:
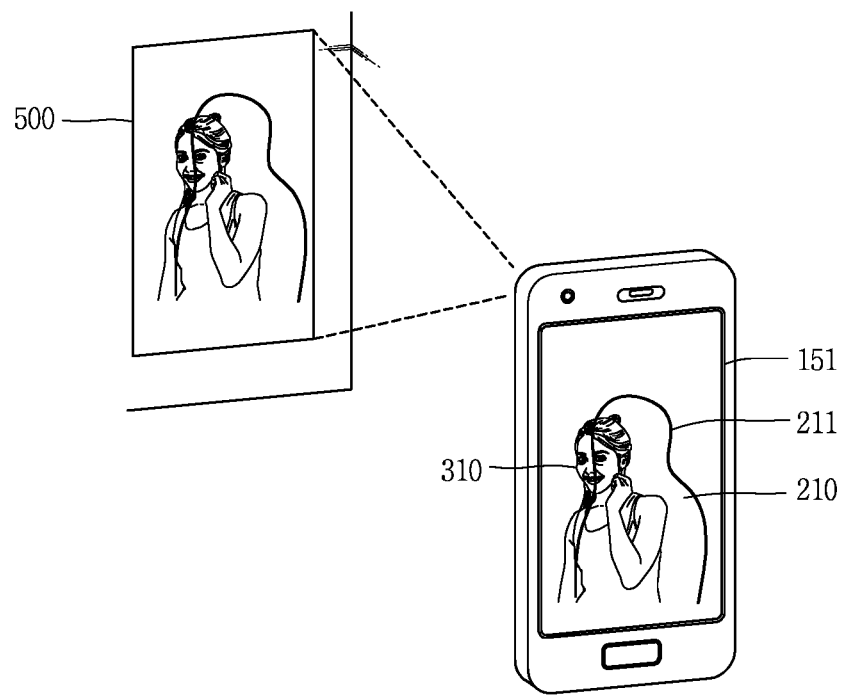

Hereinafter, a method for outputting position information using a projector function provided in the mobile terminal will be described with reference to FIG. 6B. In particular, the mobile terminal may include a projector module which can project an image on a screen or wall in an enlarged (zoom-in) state. The controller 180 may use the projector module to output the reference region 210 and the object 310 both displayed on the display unit 151 on a position 500 that the user sets.

Hence, the user can render the object 310 located on the reference region 210 based on an image of the display unit 151 projected on the screen or wall. In addition to directly providing the user with the position information using the text, sound, image and the flash 123, the controller 180 may adjust a magnification of the camera 121 or 121' or move a direction of a lens such that the object can be located on the reference region.

Figure 6C:
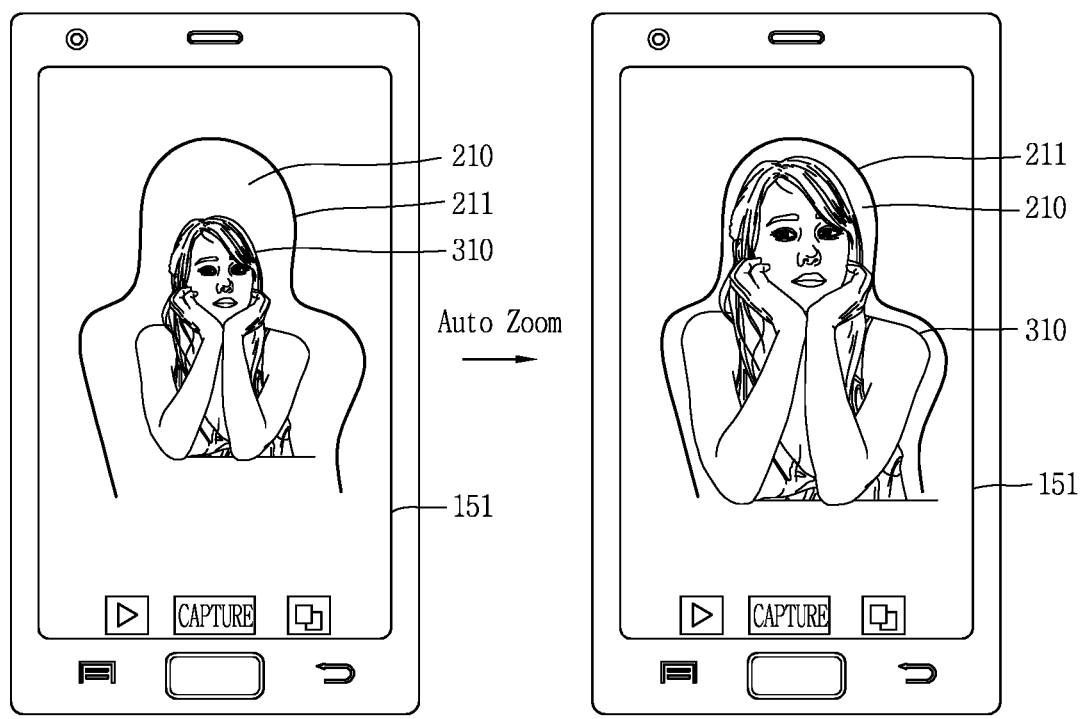

For example, as shown in FIG. 6C, when the object 310 is located on the reference region 210 but does not occupy the reference region 210 by more than a specific range, the controller 180 may automatically adjust the magnification of the camera 121 or 121' such that the object 310 output on the display unit 151 can zoom in, resulting in allowing the object 310 to correspond to the reference region 210.

Figure 6D:
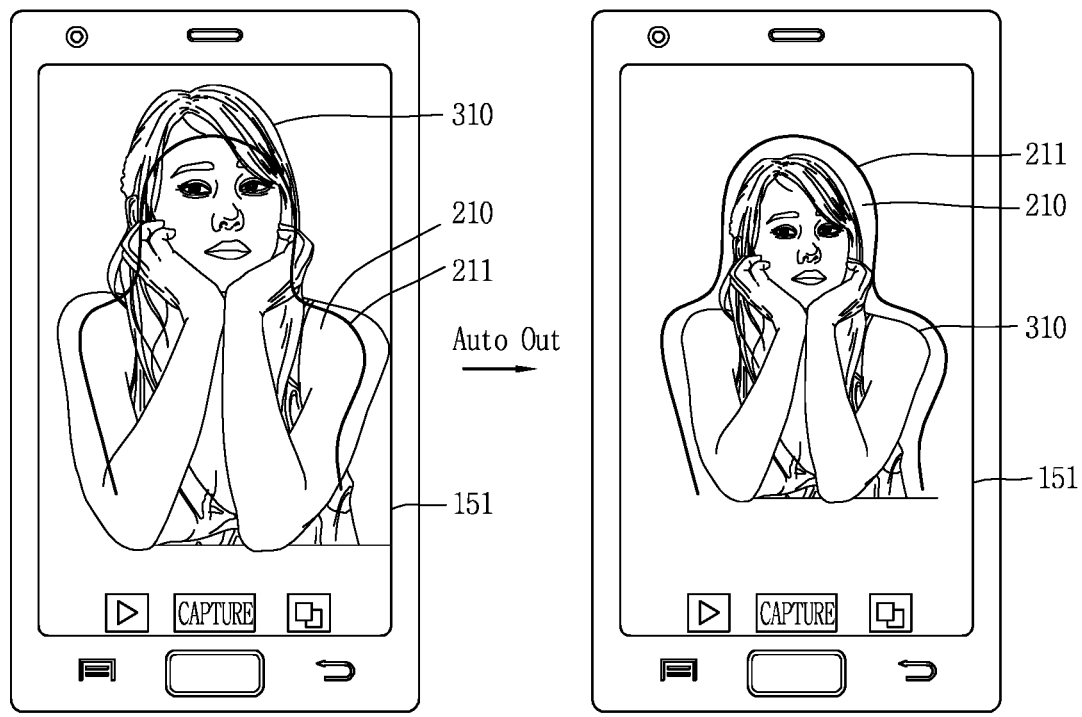

Similarly, as shown in FIG. 6D, when the object 310 is located on the reference region 210 but exceeds the specific range so as to be partially out of the reference region 210, the controller 180 may automatically adjust the magnification of the camera 121 or 121' such that the object 310 output on the display unit 151 can be reduced (zoom out), such that the object 310 can correspond to the reference region 210.

As mentioned above, in the mobile terminal and the control method thereof, position information can be output in various manners in order for an object output on the display unit 151 to correspond to a reference region. In addition, the number of objects recognized by the controller 180 can be set and objects may be recognized according to the set number so as to provide position information thereof.

In the previous embodiments, description has been given of the method in which one object is recognized, whether the recognized object corresponds to a reference region is determined, and position information regarding the object is output according to the determination. Alternatively, the controller 180 may recognize a plurality of objects and determine whether the plurality of objects are all located on a reference region.

Figure 7A:
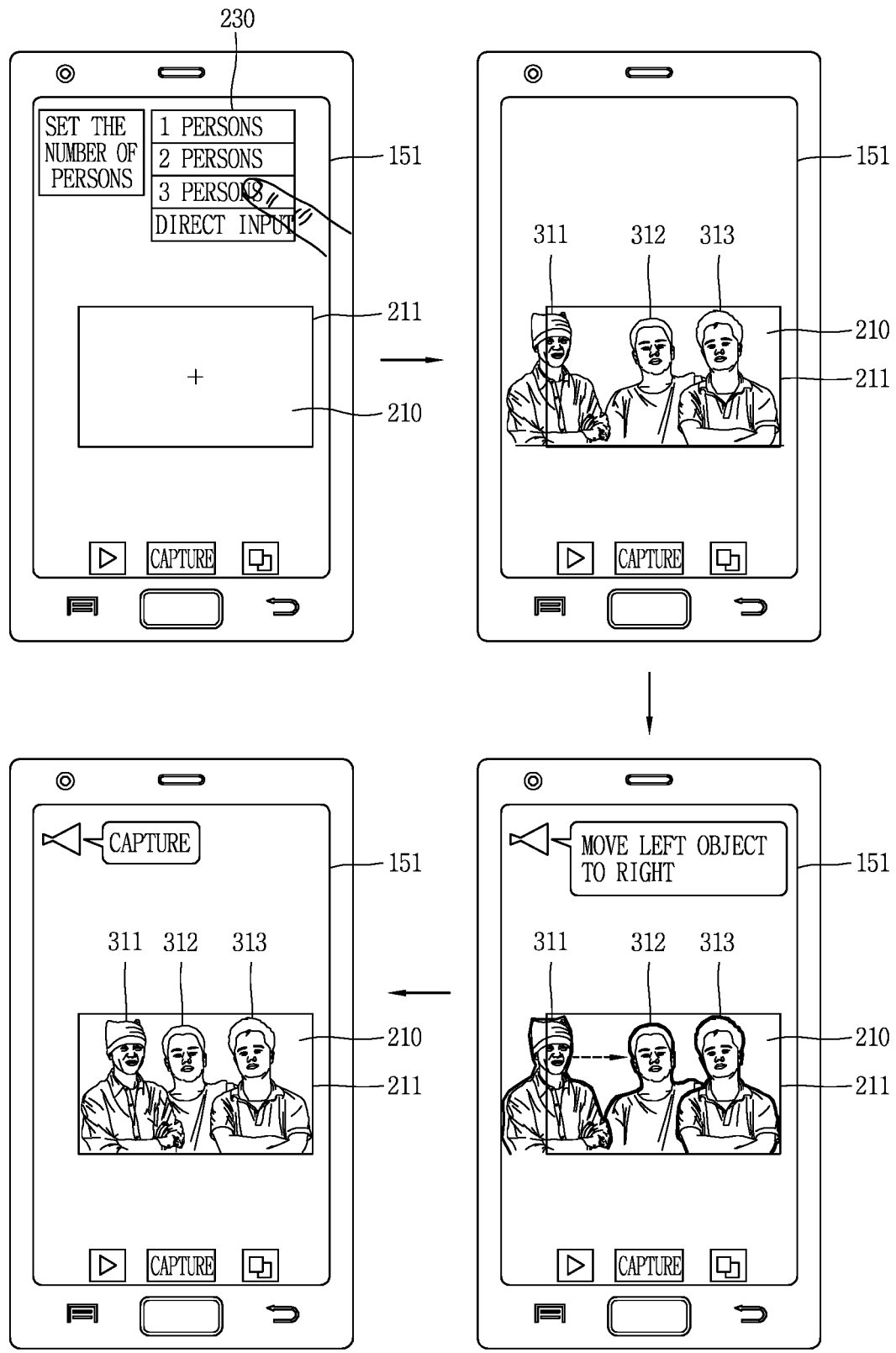
FIGS. 7A to 7C are overviews showing a method for capturing a plurality of objects to be captured in a mobile terminal in accordance with one embodiment.

For example, as shown in FIG. 7A, when the number of objects to be recognized by the controller 180 is set via a select window 230 displayed on the display unit 151, the controller 180 may determine whether the set number of objects are all located on the reference region. Also, the controller 180 may output position information, based on the determination result, so as to guide those objects to be located on the reference region 210.

Here, the controller 180 may output detailed position information by determining each position of the plurality of objects or output position information relating to whether one of the objects is located outside the reference region 210, namely, separation information related to the objects. For example, when the number of object is set such that a user recognizes three persons, the controller 180 may recognize the three persons, namely, first to third objects 311, 312, 313 from an image output on the display unit 151, and determine whether the first to third objects 311, 312, 313 are all located on the reference region 210.

When at least one of the recognized first to third objects 311, 312, 313 is located outside the reference region 210, the controller 180 may output position information to guide the first object 311 located outside the reference region to be located within the reference region. Also, when the first to third objects 311, 312, 313 are all located on the reference region 210, the controller 180 may output position information indicating that the capturing is allowed.

Figure 7B:
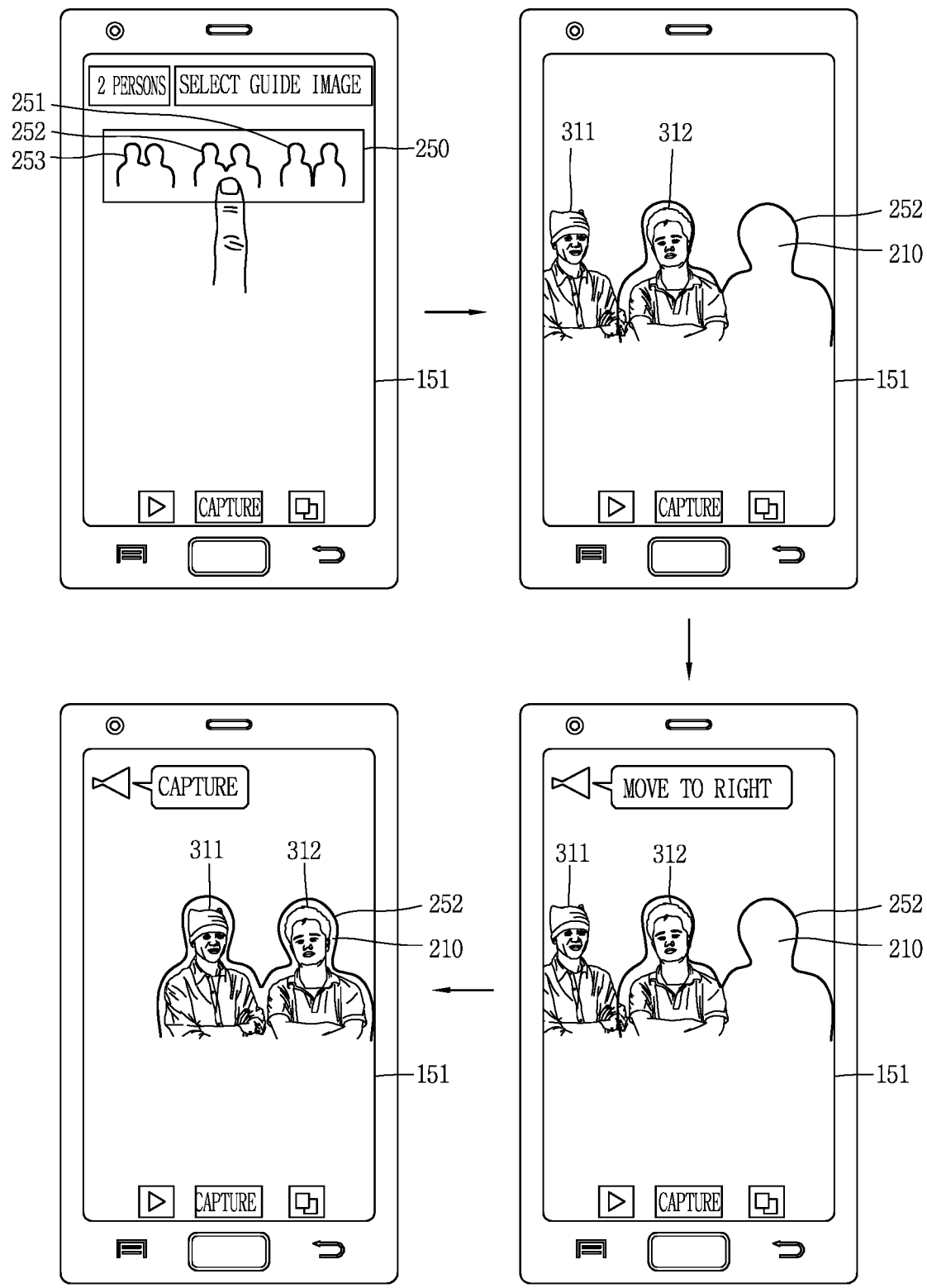

Referring to FIG. 7B, the controller 180 may display a select window 250 for selecting a shape of a reference region suitable for a set number of persons, set a reference region corresponding to the selected shape via the select window 250, and determine whether the plurality of objects are located within the reference region.

Figure 7C:
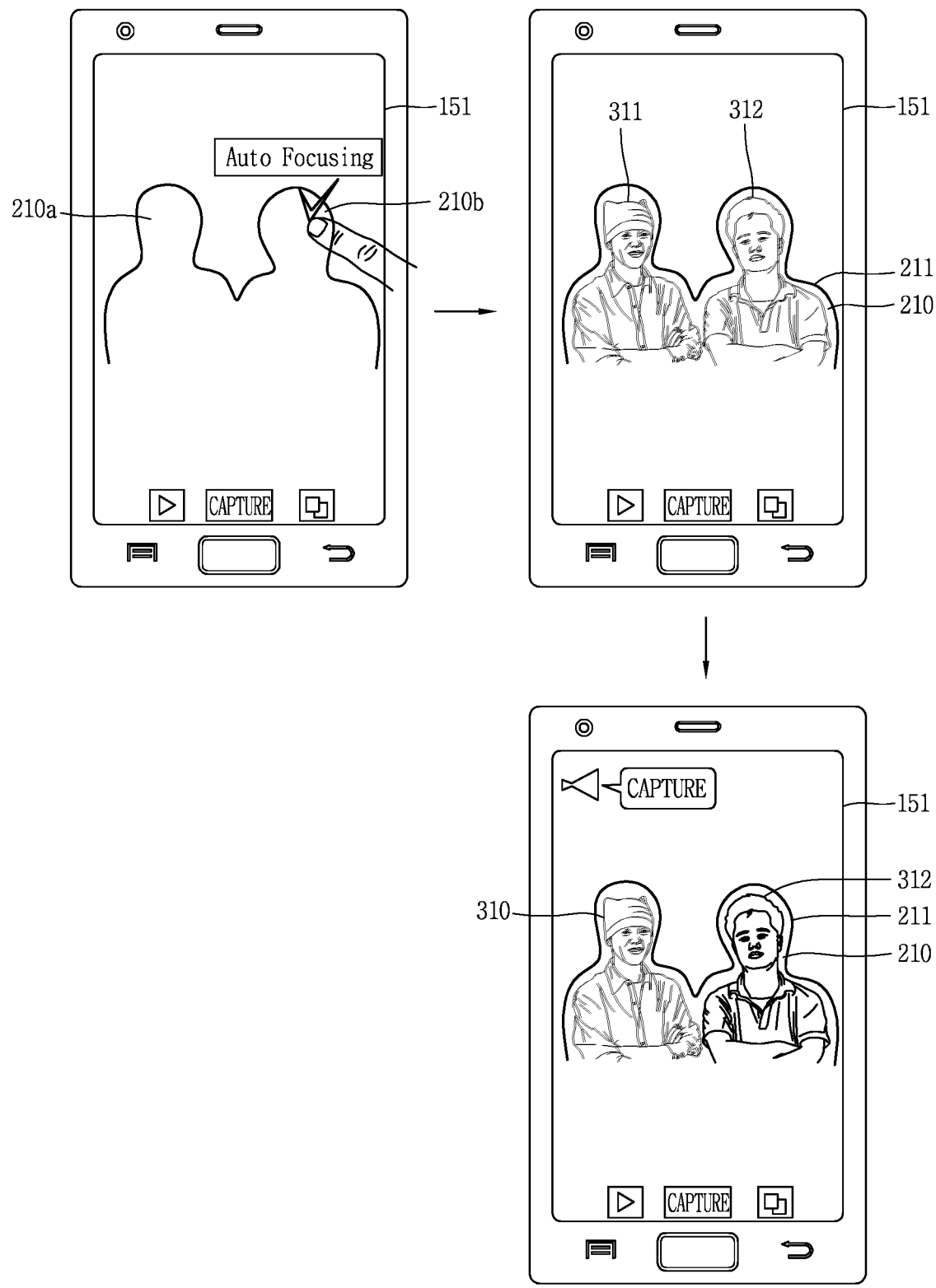

Referring to FIG. 7C, when a plurality of objects are recognized by the controller 180, the user may select one of the objects to be spot-focused thereon. When the selected object is spot-focused, the controller 180 may set an image to be captured even when the other objects are not focused. For example, as shown in FIG. 7C, when the first and second objects 311 and 312 are set to be recognized by the controller 180 and the corresponding reference region 210 is set, the controller 180 may select a region set to be spot-focused.

For example, when a user selects a right reference region 210*b* of the reference region 210 to be spot-focused, even when the first object 311 corresponding to the left reference region 210*a* is not focused, the controller 180 may determine only whether the right reference region 210*b* has been focused. Hence, as shown, even when the first object 311 is out of focus, if the second object 312 is in focus, the controller 180 may output position information indicating that an image output on the display unit 151 can be captured. Also, in the mobile terminal and the control method, a background screen may be preset and an object may be controlled to be output on a user-set region on the preset background screen.

Figure 8:
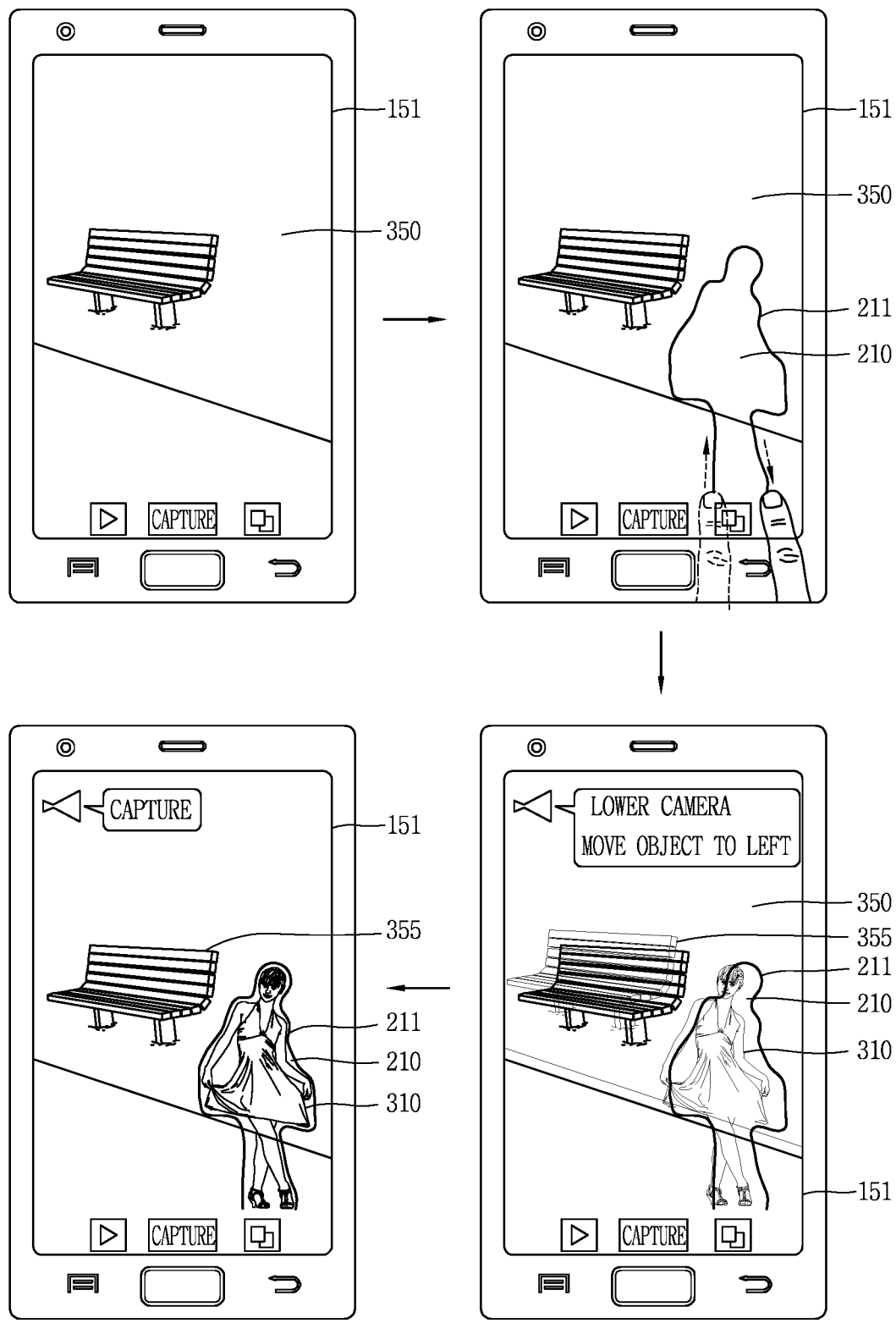
FIGS. 8 and 9 are overviews showing a method for capturing an object together with a background in a mobile terminal in accordance with embodiments.

FIG. 8 is an overview showing a method for capturing an object together with a background in a mobile terminal in accordance with one embodiment. As shown in FIG. 8, after a user captures an image, when the captured image 350 is output on the display unit 151, the user may select a reference region desiring to output thereon an object included in the image 350 output on the display unit 151.

Afterwards, the controller 180 may compare an image input via the camera 121 or 121' with the captured image 350 and simultaneously the object with the reference region 210, so as to provide both position information relating to the image input via the camera 121 or 121', namely, a background screen 355, and position information relating to the object 310.

For example, when the captured background screen 350 does not correspond to the background screen 355 currently input via the camera 121 or 121', the controller 180 may output related position information, for example, "Lower camera." Also, when a relative distance between the object 310 and the reference region 210 is more than a preset range, the controller 180 may output position information relating to the object, for example, "Move object to left."

In addition, the controller 180 may output the captured background screen 350 on the display unit 151 to overlap the background image 355 input via the camera 121 or 121', thereby providing the user with information regarding a direction that the camera 121 or 121' is to be moved. Meanwhile, when a deviation within a preset range is present between the captured background screen 350 and the background image 355 currently input via the camera 121 or 121', the controller 180 may recognize it as a capture-available range even if the two background screens 350 and 355 does not completely correspond to each other.

Figure 2C:
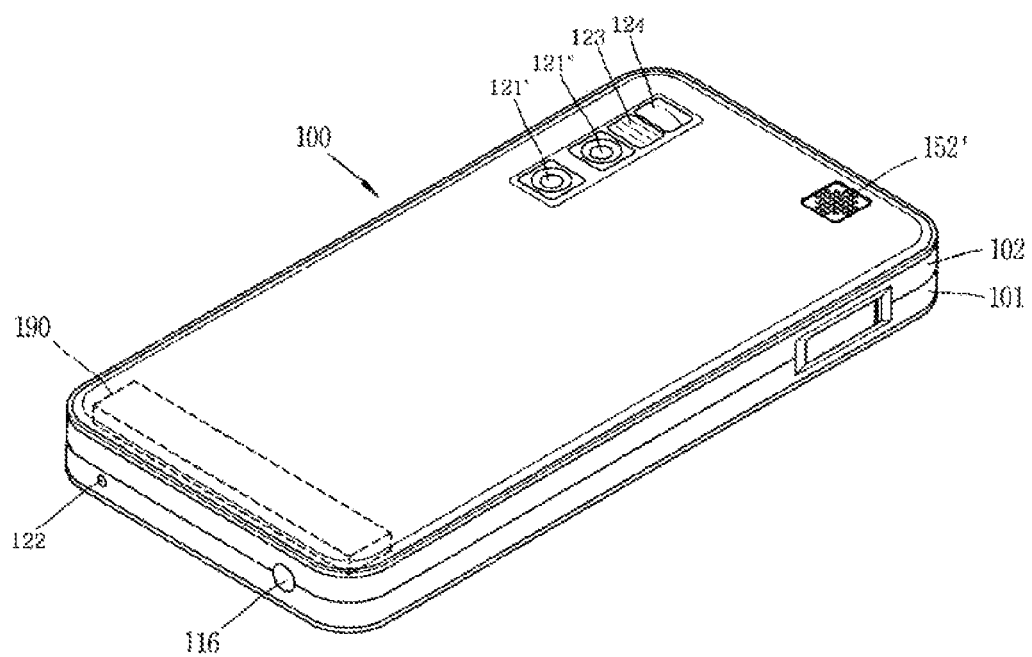

When the mobile terminal is capable of capturing a 3D image, a plurality of cameras, especially, two cameras, for example, a first camera 121' and a second camera 121" may be provided on one surface of the mobile terminal (see FIG. 2C). Here, the 3D image may be created by using binocular disparity. Referring to FIG. 2C, the 3D image can be captured using the first camera 121' and the second camera 121".

In the meantime, even if the 3D image is not captured using the first camera 121' and the second camera 121" at the same time, the two cameras can all be used to capture an image that the user wants. As one example, FIG. 9 is an overview showing a method for capturing an object together with a background in a mobile terminal in accordance with another embodiment.

Figure 9:
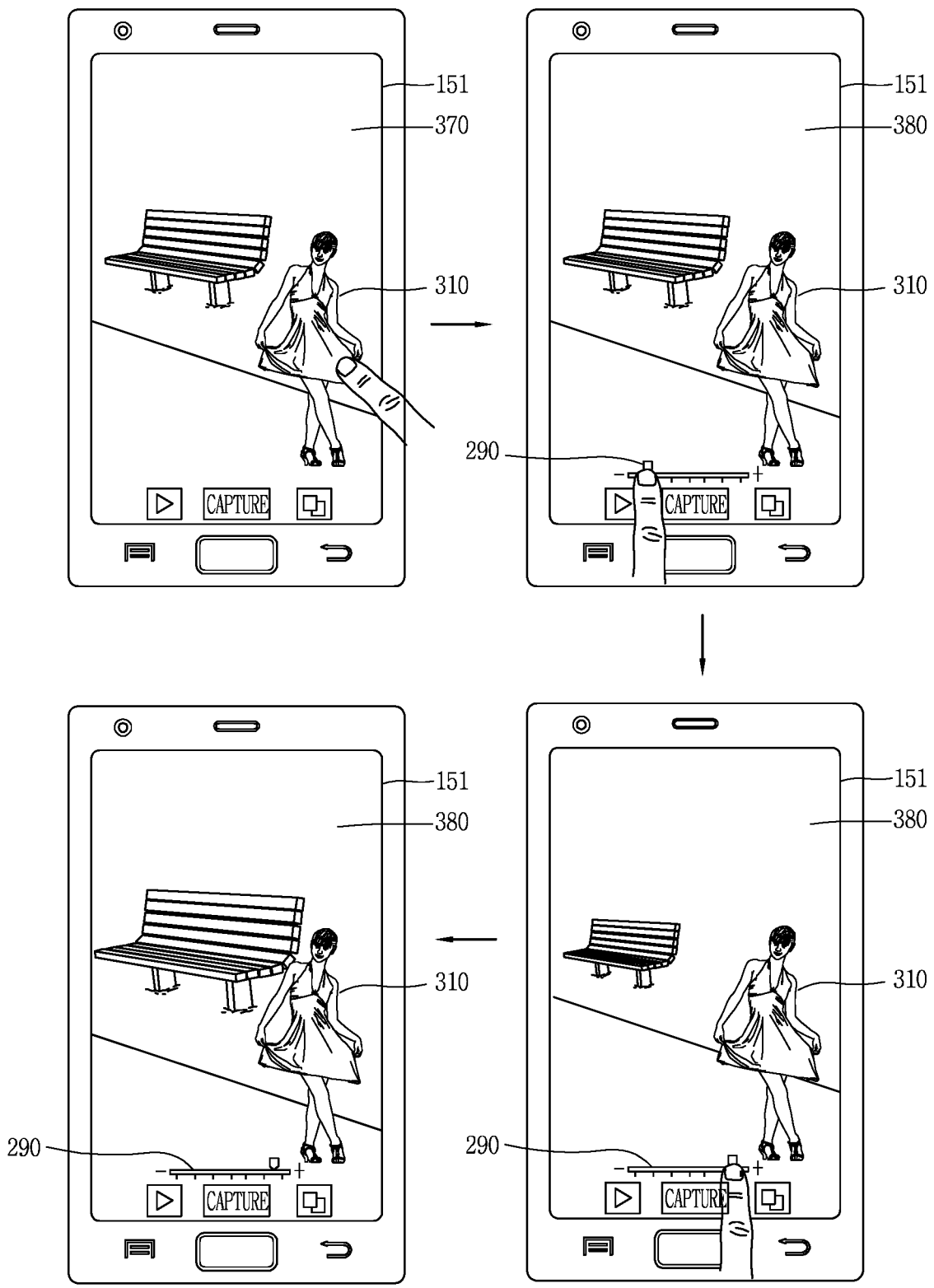

First, referring to FIG. 9, a first image 370 input via the first camera 121' is output on the display unit 151. When objects are recognized in the first image 370 by the controller 180, a user may select at least one of the recognized objects. The controller 180 may then output a second image 380, which is input via the second camera 121", together with the selected object 310. Here, the selected object 310 may be output in a fixed state without being affected by zoom-in (size enlargement), zoom-out (size reduction) and movement of the image 380 input via the second camera 121".

The other image excluding the object selected by the user from the first image 370 may not be output on the display unit 151, and an object of the second image corresponding to the object 310 may not be output as well. That is, as shown in FIG. 9, the display 151 may output the object 310 included in the first image 370 and the background included in the second image 380.

Also, the user may zoom out or zoom in the second image 380 using an adjustment bar 290. Here, in FIG. 9, only the second image 380 may zoom in or zoom out with the object 310 being fixed on the display unit 151. An image may be captured after adjusting the object 310 to be located on a desired position by adjustment with respect to the second image 380. Here, the controller 180 may extract parts of the images input via the first and second cameras 121' and 121" and combine the extracted parts so as to capture an image.

As so far described, the mobile terminal and the control method according to embodiments of the present invention provide position information such that an object can be captured together with a background screen with a user-desired composition and at a user-desired position. Further, an object may be recognized and a position of the recognized object may be compared with a set region, thereby determining whether the object is located within the set region.

In accordance with the mobile terminal and the control method thereof, a distance and a direction between a set region and an object may be detected, and detected information may be provided to a user, thereby providing position information for locating the object on the set region. Further, a user is allowed to set a shape, size and position of a region where an object is to be located, thereby making the object captured on the user-desired region.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
    a wireless communication unit configured to wirelessly communicate with at least one other terminal;
    at least one camera configured to obtain a first image and a second image;
    a display unit; and
    a controller configured to:
    set a user-drawn reference region on the display unit,
    display a guide image corresponding to the reference region,
    output position information regarding a position of an object included in the image obtained by the at least one camera and the set reference region,
    control the at least one camera to capture the first image, when the first object is located on the set reference region, said first image further including a second object in proximate relationship to the first object,
    receive a selection signal indicating a selection of the first object,
    control the at least one camera to obtain the second image, said second image including the first and second objects,
    receive a zooming selection indicating a zooming of the second image,
    zoom only the second object included in the second image while fixing the first object included in the second image, and
    control the at least one camera to capture the second image including the fixed first object and zoomed second object.

2. The terminal of claim 1, wherein the controller is further configured to determine whether or not the object is located on the reference region, and to output relative position information relating to the reference region and the object based on the determination.

3. The terminal of claim 2, wherein the controller is further configured to output the position information using at least one of voice instructions and a flash on the mobile terminal.

4. The terminal of claim 3, wherein the controller is further configured to change a brightness of the flash according to a degree that the object is located on the reference region.

5. The terminal of claim 2, wherein when the at least one camera enters a capturing mode, the first object is output on the display unit, and
    wherein when the first object is located on the reference region, the controller is further configured to store the image output on the display unit.

6. The terminal of claim 1, wherein the controller is further configured to capture the image output by the at least one camera when a magnification of the at least one camera is adjusted such that the first object corresponds to the reference region.

7. The terminal of claim 1, wherein the controller is further configured to recognize a plurality of objects from the image, and to determine whether the recognized plurality of objects are all located on the reference region.

8. The terminal of claim 7, wherein when at least one of the plurality of objects exceeds a preset size based on the reference region, the controller is further configured to output separation information indicating that the first object is out of the reference region.

9. The terminal of claim 7, wherein the number of objects recognized by the controller is set by a user selection.

10. The terminal of claim 1, wherein the display unit and the at least one camera are on opposite surfaces of the mobile terminal such that the first object cannot see the display unit.

11. A method of controlling a mobile terminal, the method comprising:
    allowing, via a wireless communication unit of the mobile terminal, wireless communication with at least one other terminal;
    obtaining, via at least one camera of the mobile terminal, a first image and a second image;
    setting, via a controller of the mobile terminal, a user-drawn reference region on a display unit of the mobile terminal;
    displaying, via the display unit, a guide image corresponding to the reference region;
    outputting, via the controller, position information regarding a position of an object included in the image obtained by the at least one camera and the set reference region;
    controlling, via the controller, the at least one camera to capture the first image, when the first object is located on the set reference region, said first image further including a second object in proximate relationship to the first object;
    receiving a selection signal indicating a selection of the first object;
    controlling, via the controller, the at least camera to obtain the second image, said second image including the first and second objects;
    receiving a zooming selection indicating a zooming of the second image;
    zooming, via the controller, only the second object included in the second image while fixing the first object included in the second image; and
    controlling, via the controller, the at least one camera to capture the second image including the fixed first object and zoomed second object.

12. The method of claim 11, further comprising:
    determining whether or not the object is located on the reference region; and
    outputting relative position information relating to the reference region and the object based on the determination using at least one of voice instructions and a flash on the mobile terminal.

13. The method of claim 11, further comprising:
    recognizing a plurality of objects from the image;
    determining whether the recognized plurality of objects are all located on the reference region; and
    when at least one of the plurality of objects exceeds a preset size based on the reference region, outputting separation information indicating that the object is out of the reference region.

* * * * *